(12) United States Patent
Merry et al.

(10) Patent No.: US 9,194,329 B2
(45) Date of Patent: *Nov. 24, 2015

(54) GAS TURBINE ENGINE SHAFT BEARING CONFIGURATION

(71) Applicant: United Technologies Corporation, Hartford, CT (US)

(72) Inventors: Brian D. Merry, Andover, CT (US); Gabriel L. Suciu, Glastonbury, CT (US); Karl L. Hasel, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,112

(22) Filed: Mar. 19, 2014

(65) Prior Publication Data

US 2014/0205439 A1   Jul. 24, 2014

Related U.S. Application Data

(63) Continuation of application No. 14/012,773, filed on Aug. 28, 2013, now Pat. No. 8,863,491, and a continuation-in-part of application No. 13/904,416, filed on May 29, 2013, which is a continuation of (Continued)

(51) Int. Cl.
*F02C 1/06* (2006.01)
*F02K 3/00* (2006.01)
(Continued)

(52) U.S. Cl.
CPC ............... *F02K 3/00* (2013.01); *F01D 25/162* (2013.01); *F02C 7/06* (2013.01); *F02C 7/36* (2013.01); *F02K 3/04* (2013.01); *Y10T 29/4932* (2015.01)

(58) Field of Classification Search
CPC ............... F02C 7/36; F02C 3/113; F02K 3/06
USPC ......... 60/226.1, 39.163, 39.08; 415/132, 142, 415/229, 110, 111
See application file for complete search history.

(56) References Cited

U.S. PATENT DOCUMENTS 2,672,726 A    3/1954   Wolf et al.
2,798,360 A    7/1957   Hazen et al.
(Continued)

FOREIGN PATENT DOCUMENTS

EP    1013889    8/2005
EP    1939430    7/2008
(Continued)

OTHER PUBLICATIONS

Gunston, Bill, "Jane's Aero-Engines," Issue Seven, 2000, pp. 510-512.

(Continued)

*Primary Examiner* — Gerald L Sung
(74) *Attorney, Agent, or Firm* — Carlson, Gaskey & Olds, P.C.

(57) ABSTRACT

A gas turbine engine includes a housing including an inlet case and an intermediate case that respectively provide an inlet case flow path and an intermediate case flow path. A geared architecture is arranged within the inlet case. The geared architecture includes an epicyclic gear train. A fan is rotationally driven by the geared architecture. A shaft provides a rotational axis. A hub is operatively supported by the shaft. First and second bearings support the shaft relative to the intermediate case and the inlet case, respectively.

4 Claims, 3 Drawing Sheets

Related U.S. Application Data application No. 13/762,970, filed on Feb. 8, 2013, now Pat. No. 8,511,061, which is a continuation of application No. 13/362,170, filed on Jan. 31, 2012, now Pat. No. 8,402,741.

(60) Provisional application No. 61/860,337, filed on Jul. 31, 2013.

(51) Int. Cl.
    *F02C 7/36* (2006.01)
    *F01D 25/16* (2006.01)
    *F02K 3/04* (2006.01)
    *F02C 7/06* (2006.01)

(56) References Cited

U.S. PATENT DOCUMENTS

| | | |
|---|---|---|
| 2,850,337 A | 9/1958 | McCallum |
| 3,434,288 A | 3/1969 | Petrie |
| 3,549,272 A | 12/1970 | Bouiller et al. |
| 3,638,428 A | 2/1972 | Shipley et al. |
| 3,673,802 A | 7/1972 | Krebs et al. |
| 3,680,309 A | 8/1972 | Wallace, Jr. |
| 3,727,998 A | 4/1973 | Haworth et al. |
| 3,737,109 A | 6/1973 | Johansson |
| 3,738,719 A | 6/1973 | Langner |
| 3,747,343 A | 7/1973 | Rosen |
| 3,761,042 A | 9/1973 | Denning |
| 3,792,586 A | 2/1974 | Kasmarik et al. |
| 3,896,615 A | 7/1975 | Slatkin et al. |
| 3,925,979 A | 12/1975 | Ziegler |
| 3,971,208 A | 7/1976 | Schwent |
| 4,003,199 A * | 1/1977 | Bell et al. .......... 60/791 |
| 4,055,946 A | 11/1977 | Sens |
| 4,084,861 A | 4/1978 | Greenberg et al. |
| 4,251,987 A | 2/1981 | Adamson |
| 4,452,037 A | 6/1984 | Waddington et al. |
| 4,500,143 A | 2/1985 | Kervistin et al. |
| 4,523,864 A | 6/1985 | Walter et al. |
| 4,687,346 A | 8/1987 | Suciu |
| 4,704,862 A | 11/1987 | Dennison et al. |
| 4,727,762 A | 3/1988 | Hayashi |
| 4,782,658 A | 11/1988 | Perry |
| 4,827,712 A | 5/1989 | Coplin |
| 4,867,655 A | 9/1989 | Barbic et al. |
| 4,911,610 A | 3/1990 | Olschewski et al. |
| 4,916,894 A | 4/1990 | Adamson et al. |
| 4,951,461 A | 8/1990 | Butler |
| 4,952,076 A | 8/1990 | Wiley, III et al. |
| 4,981,415 A | 1/1991 | Marmol et al. |
| 5,051,005 A | 9/1991 | Duncan |
| 5,127,794 A | 7/1992 | Burge et al. |
| 5,155,993 A | 10/1992 | Baughman et al. |
| 5,174,525 A | 12/1992 | Schilling |
| 5,343,696 A | 9/1994 | Rohra et al. |
| 5,380,155 A | 1/1995 | Varsik et al. |
| 5,410,870 A | 5/1995 | Brault et al. |
| 5,433,674 A | 7/1995 | Sheridan et al. |
| 5,553,449 A | 9/1996 | Rodgers et al. |
| 5,622,438 A | 4/1997 | Walsh et al. |
| 5,687,561 A | 11/1997 | Newton |
| 5,791,789 A | 8/1998 | Van Duyn et al. |
| 5,806,303 A | 9/1998 | Johnson |
| 5,809,772 A | 9/1998 | Giffin, III et al. |
| 5,860,275 A | 1/1999 | Newton et al. |
| 5,867,980 A | 2/1999 | Bartos |
| 6,082,959 A | 7/2000 | Van Duyn |
| 6,148,518 A | 11/2000 | Weiner et al. |
| 6,158,210 A | 12/2000 | Orlando |
| 6,203,273 B1 | 3/2001 | Weiner et al. |
| 6,338,609 B1 | 1/2002 | Decker et al. |
| 6,439,772 B1 | 8/2002 | Ommundson et al. |
| 6,464,401 B1 | 10/2002 | Allard |
| 6,619,030 B1 | 9/2003 | Seda et al. |
| 6,623,166 B2 | 9/2003 | Andren et al. |
| 6,732,502 B2 | 5/2004 | Seda et al. |
| 6,942,451 B1 | 9/2005 | Alexander et al. |
| 7,004,722 B2 | 2/2006 | Teramura et al. |
| 7,412,819 B2 | 8/2008 | Bart et al. |
| 7,487,630 B2 | 2/2009 | Weiler |
| 7,490,460 B2 | 2/2009 | Moniz et al. |
| 7,493,753 B2 | 2/2009 | Moniz et al. |
| 7,500,365 B2 | 3/2009 | Suciu et al. |
| 7,591,594 B2 | 9/2009 | Charier et al. |
| 7,634,916 B2 | 12/2009 | Mace et al. |
| 7,694,505 B2 | 4/2010 | Schilling |
| 7,704,178 B2 | 4/2010 | Sheridan et al. |
| 7,730,715 B2 | 6/2010 | Grudnoski et al. |
| 7,832,193 B2 | 11/2010 | Orlando et al. |
| 7,882,693 B2 | 2/2011 | Schilling |
| 7,883,315 B2 | 2/2011 | Suciu et al. |
| 8,075,261 B2 | 12/2011 | Merry et al. |
| 8,104,262 B2 * | 1/2012 | Marshall .......... 60/226.2 |
| 8,225,593 B2 | 7/2012 | Le Hong et al. |
| 8,337,149 B1 | 12/2012 | Hasel et al. |
| 8,402,741 B1 | 3/2013 | Merry et al. |
| 2001/0047651 A1 | 12/2001 | Fukutani |
| 2005/0026745 A1 * | 2/2005 | Mitrovic .......... 475/348 |
| 2005/0150204 A1 | 7/2005 | Stretton et al. |
| 2005/0265825 A1 | 12/2005 | Lewis |
| 2006/0090451 A1 | 5/2006 | Moniz et al. |
| 2006/0130456 A1 | 6/2006 | Suciu et al. |
| 2006/0196164 A1 | 9/2006 | Donohue |
| 2006/0239845 A1 | 10/2006 | Yamamoto et al. |
| 2007/0084183 A1 | 4/2007 | Moniz et al. |
| 2007/0087892 A1 | 4/2007 | Orlando et al. |
| 2007/0251210 A1 | 11/2007 | Ceric et al. |
| 2008/0022653 A1 * | 1/2008 | Schilling .......... 60/226.1 |
| 2008/0053062 A1 | 3/2008 | Tuttle |
| 2008/0098715 A1 | 5/2008 | Orlando et al. |
| 2008/0098717 A1 | 5/2008 | Orlando et al. |
| 2008/0148707 A1 | 6/2008 | Schilling |
| 2008/0152477 A1 | 6/2008 | Moniz et al. |
| 2008/0155961 A1 | 7/2008 | Johnson |
| 2009/0056306 A1 | 3/2009 | Suciu et al. |
| 2009/0081039 A1 | 3/2009 | McCune et al. |
| 2009/0123271 A1 | 5/2009 | Coffin et al. |
| 2009/0180864 A1 | 7/2009 | Alvanos et al. |
| 2009/0314881 A1 | 12/2009 | Suciu et al. |
| 2010/0058735 A1 | 3/2010 | Hurwitz et al. |
| 2010/0105516 A1 | 4/2010 | Sheridan et al. |
| 2010/0170224 A1 | 7/2010 | Clark et al. |
| 2010/0223903 A1 | 9/2010 | Starr |
| 2011/0047959 A1 | 3/2011 | DiBenedetto |
| 2011/0123326 A1 | 5/2011 | DiBenedetto et al. |
| 2011/0130246 A1 | 6/2011 | McCune et al. |
| 2011/0219781 A1 | 9/2011 | Benjamin et al. |
| 2011/0289900 A1 * | 12/2011 | Stern .......... 60/226.2 |
| 2012/0195753 A1 | 8/2012 | Davis et al. |
| 2012/0243971 A1 | 9/2012 | McCune et al. |
| 2012/0257960 A1 | 10/2012 | Reinhardt et al. |
| 2013/0023378 A1 | 1/2013 | McCune et al. |
| 2013/0192198 A1 | 8/2013 | Brilliant et al. |
| 2013/0319006 A1 | 12/2013 | Parnin et al. |

FOREIGN PATENT DOCUMENTS

| | | |
|---|---|---|
| EP | 2060809 | 2/2011 |
| EP | 2559913 | 2/2013 |

OTHER PUBLICATIONS

Fledderjohn, "The TFE731-5: Evolution of a Decade of Business Jet Service," SAE Technical Paper, Business Aircraft Meeting & Exposition, Apr. 12-15, 1983.

International Search Report for PCT Application No. PCT/US2013/020462, Jul. 30, 2013.

International Preliminary Report on Patentability for PCT Application No. PCT/US2013/020462 date of issuance Aug. 5, 2014.

(56) References Cited

OTHER PUBLICATIONS

Walsh et al., "Gas Turbine Performance," 1998, 2004, Blackwell Science Ltd., Chapter 5, pp. 159-177.

International Search Report and Written Opinion for International Application No. PCT/US2014/043184 mailed Dec. 4, 2014.

International Search Report and Written Opinion for PCT/US14/43175 completed on Dec. 17, 2014.

Amato et al, "Planetary Gears" poster, http://www.roymech.co.uk/Useful_Tables/drive/Epi_cyclic-gears.html, downloaded Aug. 6, 2015 1 page.

"Epicylic Gears", http://www.webpages.uidaho.edu/mindworks/Machine_Design/Posters/PDF/Planetary%20Gears%20Poster.pdf, downloaded Aug. 6, 2015, pp. 1-12.

Supplementary European Search Report for European Patent Application No. 13770230.4, mailed Aug. 6, 2015.

* cited by examiner

GAS TURBINE ENGINE SHAFT BEARING CONFIGURATION

CROSS REFERENCE TO RELATED APPLICATIONS

This application is a continuation of U.S. application Ser. No. 14/012,773, filed on Aug. 28, 2013, which claims priority to U.S. Provisional Application No. 61/860,337 filed Jul. 31, 2013 and which is a continuation-in-part of U.S. application Ser. No. 13/904,416 filed on May 29, 2013, which is a continuation of U.S. application Ser. No. 13/762,970 filed on Feb. 8, 2013, now U.S. Pat. No. 8,511,061 issued Aug. 20, 2013, which is a continuation of U.S. application Ser. No. 13/362,170 filed on Jan. 31, 2012, now U.S. Pat. No. 8,402,741 issued Mar. 26, 2013.

BACKGROUND

Turbomachines, such as gas turbine engines, typically include a fan section, a turbine section, a compressor section, and a combustor section. The fan section drives air along a core flow path into the compressor section. The compressed air is mixed with fuel and combusted in the combustor section. The products of combustion are expanded in the turbine section.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

A core inlet typically controls flow of air into the core flow path. The flow of air moves from the core inlet to a compressor section inlet. The relative radial positions of the core inlet and the compressor section inlet may influence flow through the core and a profile of the turbomachine.

SUMMARY

A gas turbine engine according to an exemplary embodiment of this disclosure, among other possible things includes a housing including an inlet case and an intermediate case that respectively provide an inlet case flow path and an intermediate case flow path. A geared architecture is arranged within the inlet case. The geared architecture includes an epicyclic gear train. A fan is rotationally driven by the geared architecture. A shaft provides a rotational axis. A hub is operatively supported by the shaft. First and second bearings support the shaft relative to the intermediate case and the inlet case, respectively.

In a further embodiment of any of the foregoing gas turbine engines, further includes a rotor connected to the hub and supporting a compressor section. The compressor section being arranged axially between the inlet case flow path and the intermediate case flow path.

In a further embodiment of any of the foregoing gas turbine engines, the rotor is a first stage rotor of a low-pressure compressor.

In a further embodiment of any of the foregoing gas turbine engines, further including a variable vane array arranged upstream from the first stage rotor of the low-pressure compressor.

In a further embodiment of any of the foregoing gas turbine engines, further including a low-pressure turbine supported by the shaft. The low-pressure turbine drives the fan via the geared architecture.

In a further embodiment of any of the foregoing gas turbine engines, the low-pressure turbine has a pressure ratio that is greater than about five.

In a further embodiment of any of the foregoing gas turbine engines, at least one of the first and second bearings is arranged radially inward of the low pressure compressor.

In a further embodiment of any of the foregoing gas turbine engines, the first bearing is arranged in a first bearing support. The first bearing support is removably secured to the intermediate case, and the second bearing is arranged in a second bearing support. The second bearing support removably secured to the inlet case.

In a further embodiment of any of the foregoing gas turbine engines, the second bearing support and the geared architecture are arranged in a lubrication compartment.

In a further embodiment of any of the foregoing gas turbine engines, the first bearing is a ball bearing and the second bearing is a rolling bearing.

In a further embodiment of any of the foregoing gas turbine engines, a core inlet has a radially inner boundary that is spaced a first radial distance from the rotational axis, and a compressor section inlet having a radially inner boundary that is spaced a second radial distance from the rotational axis. A ratio of the second radial distance to the first radial distance is about 0.65 to about 0.9.

In a further embodiment of any of the foregoing gas turbine engines, the radially inner boundary of the core inlet is at a location of a core inlet stator and the radially inner boundary of the compressor section inlet is at a location of the first stage low-pressure compressor rotor.

In a further embodiment of the above, an inlet mass flow rate flux of the compressor section is configured to be from about 30 $lb/sec/ft^2$ to about 37 $lb/sec/ft^2$ when the engine is operating at a cruise speed.

In a further embodiment of any of the foregoing gas turbine engines, a turbine inlet temperature of a high-pressure turbine within the engine is configured to be from about 2,000° F. to about 2,600° F. when the engine is operating at a cruise speed.

In a further embodiment of any of the foregoing gas turbine engines, a tip speed of a blade array in the compressor section during engine operation is configured to be from about 1,050 ft/sec to about 1,350 ft/sec.

In a further embodiment of any of the foregoing gas turbine engines, the geared architecture has a gear reduction ratio of greater than about 2.3.

In a further embodiment of any of the foregoing gas turbine engines, the geared architecture includes a torque frame secured to the inlet case.

In a further embodiment of any of the foregoing gas turbine engines, the torque frame supports multiple circumferentially arranged star gears intermeshing with a sun gear.

In a further embodiment of any of the foregoing gas turbine engines, the geared architecture further includes a ring gear arranged circumferentially about and intermeshing with the star gears, the ring gear driving a fan shaft, and the fan shaft rotationally driving the fan.

In a further embodiment of any of the foregoing gas turbine engines, the shaft includes a main shaft and a flex shaft, and the flex shaft has a first end and a second end, the first end secured to the main shaft and the sun gear supported on the second end.

A method of designing a gas turbine engine according to an exemplary embodiment of this disclosure, among other possible things includes defining a housing including an inlet case and an intermediate case that respectively provide an inlet case flow path and an intermediate case flow path, configuring a geared architecture for arrangement within the inlet case, the geared architecture including an epicyclic gear train, configuring a fan to be rotationally driven by the geared architecture, defining a shaft providing a rotational axis and a hub operatively supported by the shaft, and configuring first and second bearings for supporting the shaft relative to the intermediate case and the inlet case, respectively.

In a further embodiment of any of the foregoing methods, includes defining a rotor connected to the hub and supporting a compressor section and configuring the compressor section axially between the inlet case flow path and the intermediate case flow path.

In a further embodiment of any of the foregoing methods, includes defining a variable vane array to be arranged upstream from the rotor of the compressor section.

In a further embodiment of any of the foregoing methods, includes defining a first bearing support for the first bearing such that the first bearing support is removably secured to the intermediate case, and defining a second bearing support for the second bearing such that the second bearing is removably secured to the inlet case.

In a further embodiment of any of the foregoing methods, includes configuring a core inlet to have a radially inner boundary that is spaced a first radial distance from the rotational axis, and configuring a compressor section inlet to have a radially inner boundary that is spaced a second radial distance from the rotational axis such that a ratio of the second radial distance to the first radial distance is about 0.65 to about 0.9.

A compressor module for a gas turbine engine according to an exemplary embodiment of this disclosure, among other possible things includes a housing including an inlet case and an intermediate case that respectively provide an inlet case flow path and an intermediate case flow path. A shaft provides a rotational axis. First and second bearings support the shaft relative to the intermediate case and the inlet case, respectively. A hub is operatively supported by the shaft. A rotor is connected to the hub.

In a further embodiment of any of the foregoing compressor modules, a core inlet has a radially inner boundary that is spaced a first radial distance from the rotational axis, and a compressor section inlet has a radially inner boundary that is spaced a second radial distance from the rotational axis. A ratio of the second radial distance to the first radial distance is about 0.65 to about 0.9.

In a further embodiment of any of the foregoing compressor modules, the radially inner boundary of the core inlet is at a location of a core inlet stator and the radially inner boundary of the compressor section inlet is at a location of a first stage low-pressure compressor rotor.

In a further embodiment of any of the foregoing compressor modules, the first bearing is arranged in a first bearing support, the first bearing support being removably secured to the intermediate case, and the second bearing is arranged in a second bearing support, the second bearing support being removably secured to the inlet case.

In a further embodiment of any of the foregoing compressor modules, the first bearing is a ball bearing and the second bearing is a rolling bearing.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
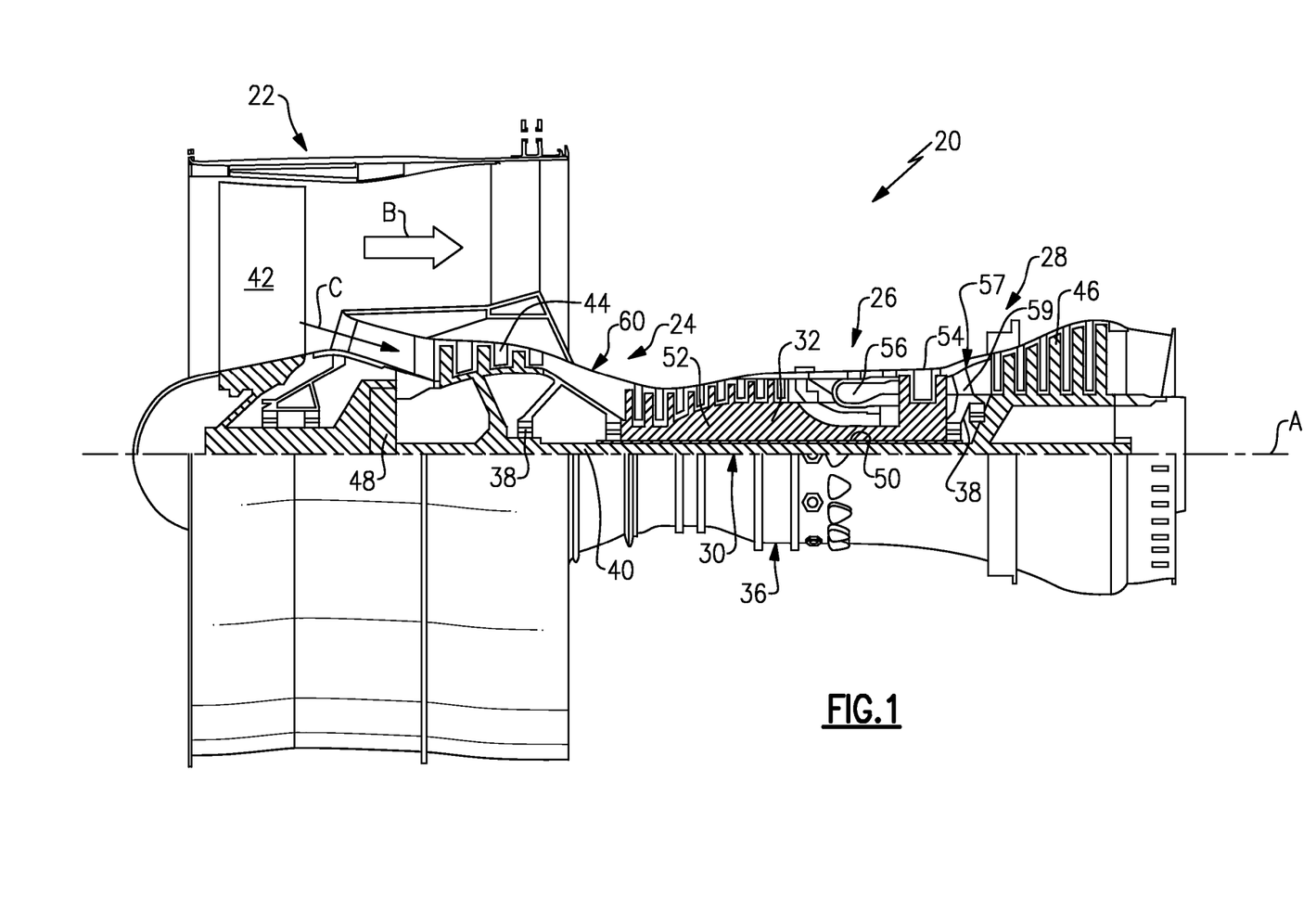
FIG. 1 schematically illustrates an embodiment of a gas turbine engine.
Figure 2:
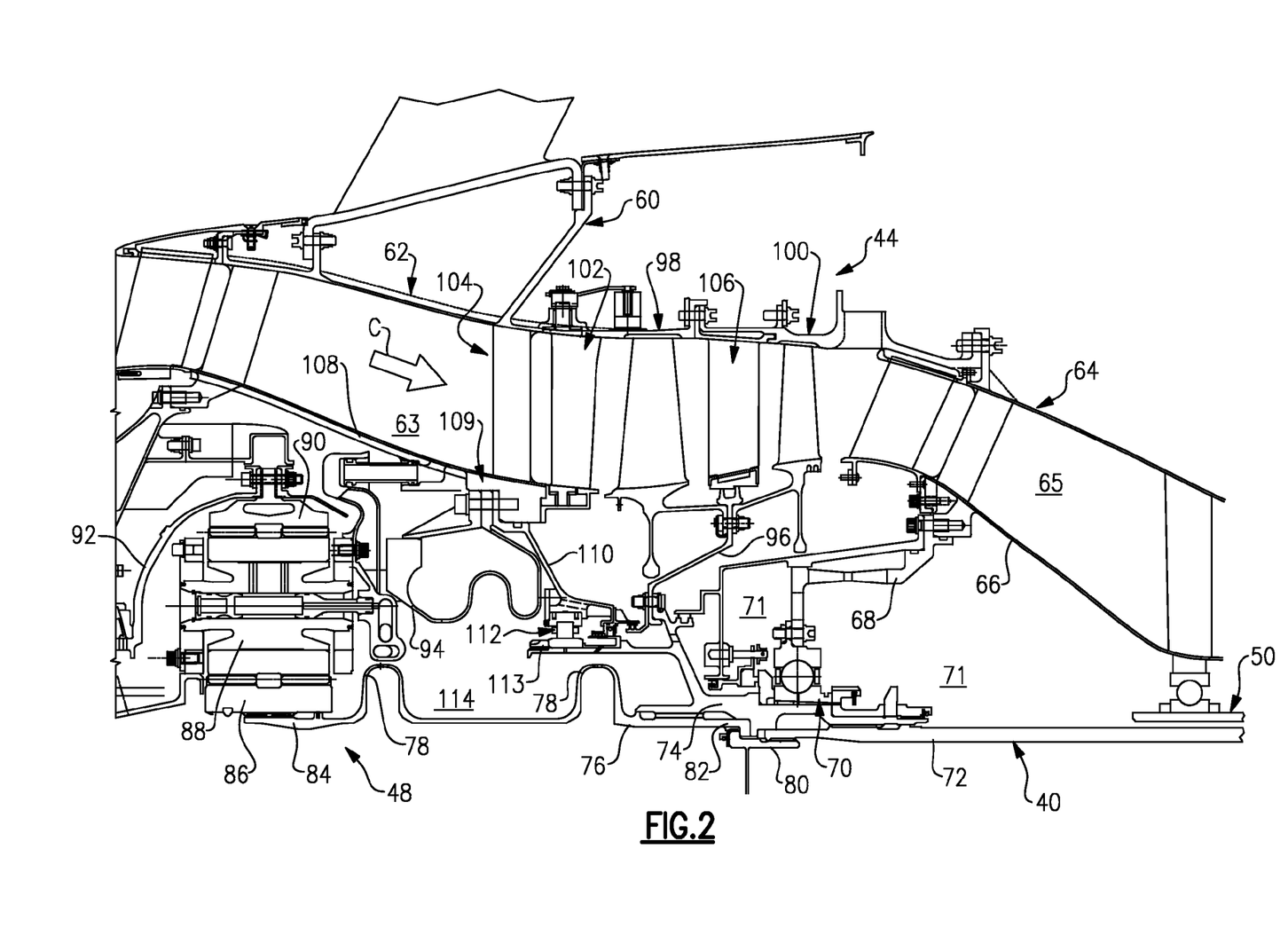
FIG. 2 is a cross-sectional view of a front architecture of the gas turbine engine embodiment shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient}\ °R)/518.7°\ R)^{0.5}]$. The "Low corrected fan tip speed" as disclosed herein according to one non-limiting embodiment is less than about 1150 ft/second (350 m/second).

Referring to FIG. 2, a core housing 60 includes an inlet case 62 and an intermediate case 64 that respectively provide an inlet case flowpath 63 and a compressor case flowpath 65. In other embodiments, the core housing may include additional cases. Similarly, the compressor section as a whole may include any number of cases. Together, the inlet and compressor case flowpaths 63, 65, in part, define a core flowpath through the engine 20, which directs a core flow C.

The intermediate case 64 includes multiple components, including the intermediate case portion 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74 (i.e., low pressure compressor hub). The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture 48 includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Figure 3:
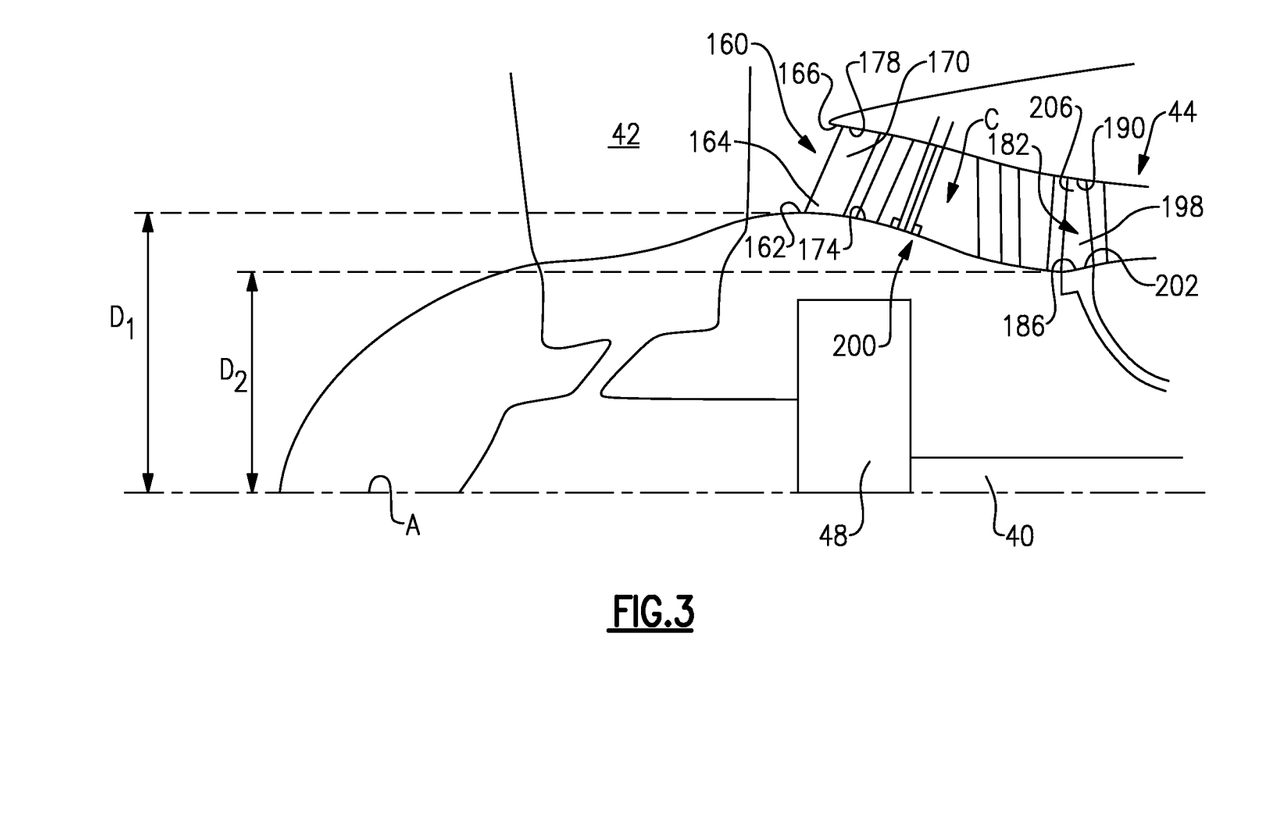
FIG. 3 shows a close-up view of a core inlet portion of the FIG. 1 gas turbine engine embodiment.

Referring now to FIG. 3 with continued reference to FIG. 1, the core flow path of the example engine 20 begins at a core inlet 160 and extends through and past the low-pressure compressor 44. The core inlet 160 has a radially inner boundary 162 and a radially outer boundary 166.

A core inlet stator 170 is located at or near the core inlet 160. The core inlet stator 170 attaches to a core case 174 at the radially inner boundary 162. The core inlet stator 170 attaches to an inlet case 178 at the radially outer boundary 166. The core inlet stator 170 extends radially across the core flow path C.

In this example, the radially inner boundary 162 is positioned a radial distance $D_1$ from the axis A. The distance $D_1$, in this example, also corresponds to the radial distance between a root 164 of the core inlet stator 170 and the axis A. In this example, the root 164 of the core inlet stator 170 is radially aligned with the radially inner boundary 162 of the core flow path C.

After flow moves through the core inlet 160, the flow moves through a compressor inlet 182 into the compressor section 24. In this example, the compressor section inlet 182 is an inlet to the low-pressure compressor 44 of the compressor section 24. The compressor inlet 182 extends from a radially inner boundary 186 to a radially outer boundary 190.

Notably, a blade 198 of a rotor within the low-pressure compressor 44 extends from a root 202 to a tip 206. The blade 198 is located at or near the compressor inlet 182. The blade 198 part of a compressor rotor within a first stage of the compressor section 24. The blade 198 is thus part of a first stage rotor, or a leading blade of the compressor section 24 relative to a direction of flow along the core flow path C.

In some examples, the blade 198 represents the axial position where air enters the compressor section 24 of the core flow path C. The blade 198 extends radially across the core flow path C.

The radially inner boundary 186 is positioned a radial distance $D_2$ from the axis A. The distance $D_2$, in this example, also corresponds to the radial distance between the root 202 of the blade 198 and the axis A. In this example, the root 202 is radially aligned with the radially inner boundary 186 of the core flow path C.

In the example engine 20, a preferred ratio range of the distance $D_2$ to the distance $D_1$ spans from about 0.65 to about 0.9, which provides a relatively low profile core flow path contour. High profile flow path contours have greater differences between $D_2$ and $D_1$, and thus larger "humps" between the core inlet 160 and the compressor inlet 182. High profile flow path contours introduce discontinuities that undesirably disrupt the airflow and undesirably add weight to the engine 20. The ratio range of about 0.65 to about 0.9 is made possible, in part, by the incorporation of the geared architecture 48 into the engine 20. The "hump" in this example is generally area 200. Additionally, since at least one of the first and second bearings 70, 112 are packaged radially inward of the low pressure compressor 44, the distance $D_2$ may be larger as compared to bearing arrangements which have bearings axially offset from the compressor section. Thus, the axially compact low pressure compressor and bearing arrangement also minimizes discontinuities in the flow path contour while reducing the axial length of the engine.

Other characteristics of the engine having this ratio may include the engine 20 having a specific inlet mass flow rate flux of the low pressure compressor at cruising speeds to be between about 30 lb/sec/ft² and about 37 lb/sec/ft². The specific inlet mass flow rate flux is the amount of flow moving into the compressor section 24 and specifically, in this example, into a compressor inlet 182 and through the compressor section 24.

Another characteristic of the example engine 20 is that the cruise speeds of the example engine are generally Mach numbers of about 0.7 to about 0.9.

Yet another characteristic of the engine 20 is that a temperature at an inlet to the high-pressure turbine 54 may be from about 2,000° F. (1093.33° C.) to about 2,600° F. (1426.66° C.). Maintaining temperatures within this range balances good fuel consumption, low engine weight, and low engine maintenance costs.

Yet another characteristic of the engine 20 is that a tip speed of blades in a rotor of the low-pressure compressor 44 (a compressor rotor) may be from about 1,050 fps (320 m/s) to about 1,350 fps (411 m/s).

In this example, the geared architecture 48 of the engine 20 may have a gear ratio of greater than about 2.3, or more specifically, a ratio of from about 2.2 to about 4.0.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A compressor module for a gas turbine engine comprising:
   a housing including an inlet case and an intermediate case that respectively provide an inlet case flow path and an intermediate case flow path;
   a shaft providing a rotational axis;
   first and second bearings supporting the shaft relative to the intermediate case and the inlet case, respectively, wherein the first bearing is arranged in a first bearing support, the first bearing support removably secured to the intermediate case, and the second bearing is arranged in a second bearing support, the second bearing support removably secured to the inlet case;
   a hub operatively supported by the shaft; and
   a rotor connected to the hub;
   a core inlet has a radially inner boundary that is spaced a first radial distance from the rotational axis, the radially inner boundary of the core inlet is at a location of a core inlet stator; and
   a compressor section inlet has a radially inner boundary that is spaced a second radial distance from the rotational axis, the radially inner boundary of the compressor section inlet is at a location of a first stage low-pressure compressor rotor, wherein a ratio of the second radial distance to the first radial distance is about 0.65 to about 0.9.

2. The compressor module as recited in claim 1, wherein the first bearing is arranged in a first bearing support, the first bearing support being removably secured to the intermediate case, and the second bearing is arranged in a second bearing support, the second bearing support being removably secured to the inlet case.

3. The compressor module as recited in claim 2, wherein the first bearing is a ball bearing and the second bearing is a rolling bearing.

4. A gas turbine engine comprising:
   a shaft providing a rotational axis;
   a hub operatively supported by the shaft;
   a housing including an inlet case and an intermediate case that respectively provide an inlet case flow path and an intermediate case flow path;
   a rotor connected to the hub and supporting a compressor section, the compressor section arranged axially between the inlet case flow path and the intermediate case flow path, the rotor is a first stage rotor of a low-pressure compressor;
   a core inlet has a radially inner boundary that is spaced a first radial distance from the rotational axis, and a compressor section inlet having a radially inner boundary that is spaced a second radial distance from the rotational axis;
   a geared architecture arranged within the inlet case, the geared architecture including an epicyclic gear train;

a fan rotationally driven by the geared architecture;

first and second bearings supporting the shaft relative to the intermediate case and the inlet case, respectively;

wherein the radially inner boundary of the core inlet is at a location of a core inlet stator and the radially inner boundary of the compressor section inlet is at a location of the first stage low-pressure compressor rotor; and a variable vane array arranged upstream from the first stage rotor of the low-pressure compressor, a low-pressure turbine supported by the shaft, the low-pressure turbine driving the fan via the geared architecture, wherein the low-pressure turbine has a pressure ratio that is greater than about five, wherein at least one of the first and second bearings is arranged radially inward of the low pressure compressor, wherein the first bearing is arranged in a first bearing support, the first bearing support removably secured to the intermediate case, and the second bearing is arranged in a second bearing support, the second bearing support removably secured to the inlet case, wherein the second bearing support and the geared architecture are arranged in a lubrication compartment, wherein the first bearing is a ball bearing and the second bearing is a rolling bearing, wherein a ratio of the second radial distance to the first radial distance is about 0.65 to about 0.9.

* * * * *